No. 738,734. Patented September 8, 1903.

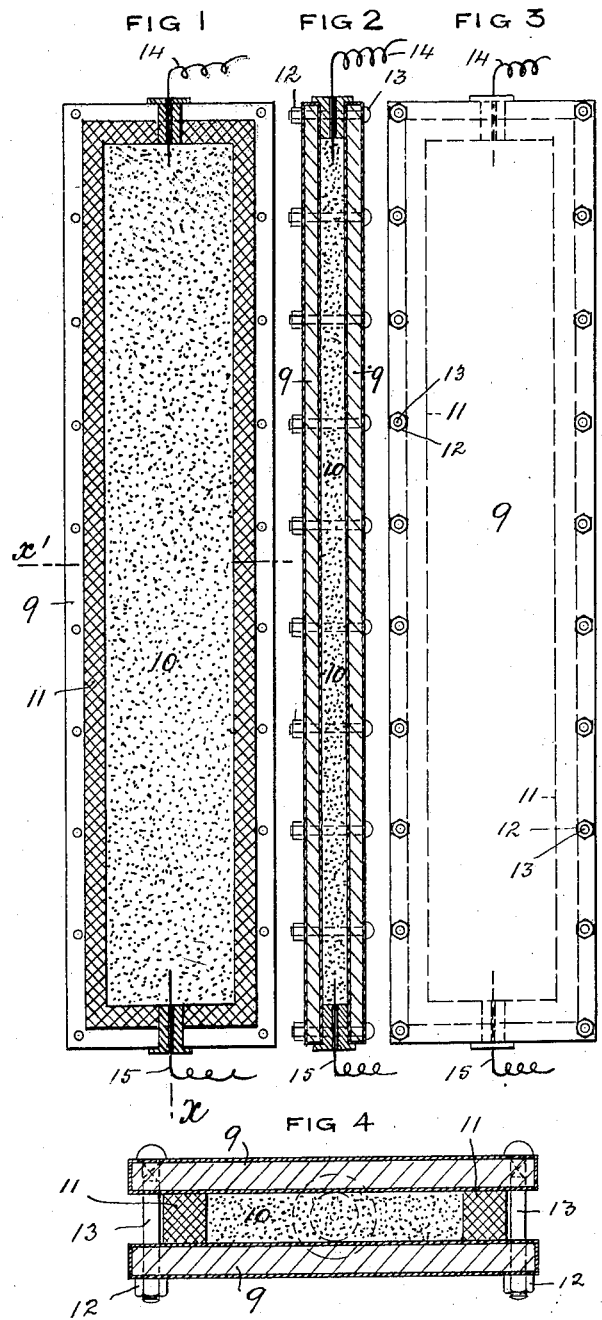

UNITED STATES PATENT OFFICE.

EDWARD GEORGE RIVERS, OF RICHMOND, ENGLAND, ASSIGNOR OF ONE-HALF TO THE ELECTRIC AND ORDNANCE ACCESSORIES COMPANY, LIMITED, OF BIRMINGHAM, ENGLAND.

ELECTRIC HEATER OR RADIATOR.

SPECIFICATION forming part of Letters Patent No. 738,734, dated September 8, 1903.

Application filed November 21, 1902. Serial No. 132,262. (No model.)

*To all whom it may concern:*

Be it known that I, EDWARD GEORGE RIVERS, civil engineer, a subject of the King of Great Britain, residing at Beverley Lodge, Richmond, in the county of Surrey, England, have invented certain new and useful Improvements in Electric Heaters or Radiators, of which the following is a specification.

This invention consists in an electrical appliance for heating the surrounding air or any other substance or liquid with which it may be placed in contact, the said appliance or heating element being capable of arrangement in batteries or groups and of being wired up in parallel or in series to an electric circuit.

Figure 1 of the accompanying drawings represents a vertical section of one form of electrical heater or radiator element constructed in accordance with my invention. Fig. 2 is a transverse vertical section of the said element upon the dotted line $x$, Fig. 1; and Fig. 3 is an elevation of the same, while Fig. 4 is a cross-section of the same on the dotted line $x'$ upon an enlarged scale.

According to my invention each heater or radiator element is composed of a pair of enamel-coated metallic plates 9, separated to a suitable distance and having located between them a layer 10, of finely-pulverized gas-retort carbon or any other suitable form of carbon in the state of the finest possible powder, the same being retained or inclosed within the space between the plates by a frame or surrounding layer of insulating and heat-resisting material 11, placed around and between the edges of the plates, so as to constitute a distance-piece, which keeps the plates apart. The plates are attached to one another and to the confining-frame by a series of nuts and bolts 12 13, located around the outer edges, and by the tightening up of these nuts the finely-pulverized carbon may be subjected to compression. The inclosed layer of finely-powdered carbon is electrically connected with a suitable circuit by wires 14 15, passed through the non-conducting frame 11 and extending for a convenient distance into the carbon, and where high-tension currents are used the carbon of each element may be divided up longitudinally or otherwise by one or more inserted strips of non-conducting and heat-resisting material, so arranged as to considerably increase the length of material through which the current has to pass in traveling from one pole or terminal of the element to the other.

The elements above described may be conveniently assembled in battery form for use as an electric heater or radiator, and the heat evolved therefrom may be modified or controlled by cutting out any desired number of sections from the total comprising the battery.

Having fully described my invention, what I desire to claim and secure by Letters Patent is—

1. An electric heater or radiator consisting of enameled metallic plates, an interposed layer of finely-powdered and compressed carbon, a frame or inclosure of non-conducting, heat-resisting material surrounding the carbon between said plates, and means for holding the parts in assembled relation.

2. An electric heater or radiator consisting of enameled metallic plates, having an interposed layer of finely-powdered and compressed carbon, a frame or inclosure of non-conducting and heat-resisting material, bolts for drawing together the plates and compressing the carbon, and connections for joining up the carbon to a suitable electric circuit, for the purpose set forth.

In testimony whereof I have hereunto set my hand in presence of two subscribing witnesses.

EDWARD GEORGE RIVERS.

Witnesses:
HENRY SKERRETT,
EDITH HELLABY.